United States Patent [19]

Nee et al.

[11] Patent Number: 5,489,124
[45] Date of Patent: Feb. 6, 1996

[54] SAFETY SHIELD

[75] Inventors: Gerard J. Nee, Essex Fells; David J. DeCarlo, Sr., Toms River, both of N.J.

[73] Assignee: Ramco Manufacturing Company, Inc., Kenilworth, N.J.

[21] Appl. No.: 243,187

[22] Filed: May 16, 1994

Related U.S. Application Data

[63] Continuation-in-part of Ser. No. 778,341, Oct. 16, 1991, Pat. No. 5,312,137, which is a continuation-in-part of Ser. No. 500,064, Mar. 27, 1990, abandoned.

[51] Int. Cl.$^6$ .................................................. F16L 55/168
[52] U.S. Cl. .................................. 285/14; 285/15; 285/45; 285/93; 285/423; 285/910
[58] Field of Search .............................. 285/14, 45, 373, 285/419, 423, 910

[56] References Cited

U.S. PATENT DOCUMENTS

| | | |
|---|---|---|
| 333,413 | 12/1885 | Hoeveler . |
| 903,316 | 11/1908 | Reimann . |
| 1,940,729 | 12/1933 | Pfefferle . |
| 2,699,960 | 1/1955 | Callery et al. . |
| 2,954,797 | 10/1960 | Dryer ............................ 285/45 X |
| 3,280,846 | 10/1966 | Anderson et al. . |
| 3,516,688 | 6/1970 | Gachot . |
| 3,944,260 | 3/1976 | Petroczky . |
| 3,954,288 | 5/1976 | Smith . |
| 4,405,161 | 9/1983 | Young et al. ................. 285/45 X |
| 4,789,184 | 12/1988 | Robertson . |
| 4,870,856 | 10/1989 | Sharp . |
| 5,064,223 | 11/1991 | Gross . |

FOREIGN PATENT DOCUMENTS

2111624  7/1983  United Kingdom .

*Primary Examiner*—Dave W. Arola
*Attorney, Agent, or Firm*—Lerner, David, Littenberg, Krumholz & Mentlik

[57] ABSTRACT

A safety shield for capturing corrosive fluids escaping from joints or valves in piping systems consists of first and second shroud members releasably joined together to form an enclosed chamber in assembled position about the joint or valve. The chamber includes at least one aperture which is sized and shaped for mating engagement around the pipe. Corrosion resistant gasket members interposed between the first and second shroud members and between the pipe and the at least one aperture render the enclosed chamber vapor tight in the assembled position. The chamber may further include at least one other aperture sized and shaped to receive the operating stem of the valve therethrough, and a corrosion resistant gasket interposed between the valve stem and the at least one other aperture for forming a vapor tight seal without interfering with the operation of the valve. The first and second shroud members are releasably held together by adjustable bands which are tightened around the outer periphery of the shroud members so as to exert a substantially uniform pressure along the joining region between the shroud members. The safety shield may also include one or more outlets for discharging any fluid which may accumulate in the enclosed chamber.

10 Claims, 6 Drawing Sheets

SAFETY SHIELD

CROSS-REFERENCE TO RELATED APPLICATION

This is a continuation-in-part of application Ser. No. 07/778,341 filed Oct. 16, 1991, now U.S. Pat. No. 5,312,137, which is a continuation-in-part of application Ser. No. 07/500,064 filed Mar. 27, 1990, now abandoned.

FIELD OF THE INVENTION

The present invention relates to a safety shield for intercepting leakage from piping systems. More particularly, the present invention relates to a safety shield which intercepts and contains both liquids and vapors which leak from a pipe joint or valve.

BACKGROUND OF THE INVENTION

Many factories, such as chemical manufacturing plants and the like, have extensive systems of piping which handle corrosive or otherwise hazardous fluids. These fluids typically consist of liquids, vapors or combinations thereof which travel through the pipes under varying pressures.

In view of the hazardous nature of these fluids, the integrity of the piping systems is critical. Notwithstanding the care exhibited in assembling and maintaining these systems, leaks occasionally develop, typically in joints between two or more pipes or between pipes and other components such as flanges, couplings, valves, expansion joints, gauges and the like. In most cases it is imperative that all of the liquid or vapor which may escape through these leaks be intercepted and contained before causing damage to equipment or, more importantly, to plant employees. This need is especially critical in those cases where the piping systems are carrying toxic materials, the escape of which would present an immediate danger to the health and even the lives of plant employees.

In addition, federal and state environmental regulations, for example, the federal Clean Air Act, as well as individual corporate air quality programs, seek to control and eliminate, or at least minimize the release of harmful materials into the environment. Such releases typically occur as standard process emissions or accidental emissions from process equipment. Many of the harmful materials these programs seek to control are cancer causing agents. Others, vapor emissions in particular, are harmful to the earth's ozone layer. Both the federal Environmental Protection Agency and the Occupational Safety and Health Administration have as their objectives the promotion and regulation of practices which minimize uncontrolled vapor and liquid releases by setting program guidelines for monitoring, detecting and containing such releases.

Presently available shields do not provide adequate safeguards to control such undesirable releases. Thus, while flexible safety shields, such as those disclosed in U.S. Pat. No. 4,106,428 to Matthiessen and co-pending application Ser. No. 07/445,176, intercept a stream of liquid which may leak from a pipe joint, they do not prevent the liquid from eventually dripping or otherwise flowing from the shield. Moreover, these flexible safety shields do not contain vapors which may escape through the pipe joint.

Other available safety shields consist of separable portions formed from a semi-rigid material which assemble around a pipe joint to form an annular chamber thereabout. The members are typically assembled by snapping the two portions together to form a loose fit about the pipe joint. Thus, since this type of shield does not form a seal around the pipe it is simply unable to contain any escaping vapors and only minimally contains escaping liquids. Furthermore, the failure of the individual components to be positively and securely assembled together presents a hazardous condition. Should a significant amount of liquid accumulate in the shield, the shield may readily come apart, exposing those persons nearby to its contents. Even in those cases when the shield does not come apart under the weight of its contents, the need to remove the shield from the pipe joint in order to empty its contents exposes maintenance workers to potential harm.

In addition, a majority of the piping systems in use today include one or more valves which may be selectively opened or closed in order to control the flow of fluids therethrough. These valves are frequently prone to leakage, particularly as they become aged and no longer provide an effective seal. Notably, none of the safety shields available today are capable of accommodating a valve without interfering with its operation, while at the same time intercepting and containing any liquid or vapor which may leak therefrom.

Thus, the need exists for an improved safety shield capable of forming an airtight seal about pipe joints and about valves in order to intercept and contain any liquid or vapor which may leak from piping systems at these points. There also exists a need for a safety shield which will surround a pipe joint or a valve in a secure fashion and not readily become disengaged therefrom. Preferably, the improved safety shield will provide adequate safeguards from the release of harmful liquids and vapors in full compliance with governmental regulations. More preferably, the improved safety shield will enable any contained fluids to be readily drained therefrom without subjecting plant employees to their hazardous contents.

SUMMARY OF THE INVENTION

In accordance with the present invention, these needs have now been addressed by the invention of an improved safety shield for a joint in a pipe carrying a fluid. The safety shield consists of first and second shroud members joined to form a vapor-tight enclosed chamber in assembled position about the pipe joint; connecting means for releasably joining the first and second shroud members together; and at least one aperture in the chamber sized and shaped to form a vapor-tight seal around the pipe. The first and second shroud members are preferably formed from a corrosion resistant material, and more preferably from a mixture of fiberglass and an organic polymer. The fiberglass preferably comprises between about 10 wt. % and about 50 wt. % of the mixture; more preferably between about 20 wt. % and about 40 wt. % of the mixture; and most preferably about 30 wt. % of the mixture.

Corrosion resistant gasket means are desirably included between the shroud members to assure the enclosure is adequately sealed. The gasket means preferably is in the form of a continuous gasket including first gasket members interposed between the joining surfaces of the shroud members and second gasket members positioned in the at least one aperture in the shroud members for forming a vapor-tight seal between the shroud members and the pipe. The first and second gasket members may be formed integrally as a single gasket element or may be formed as a plurality of gasket elements joined together.

In preferred embodiments, the first and second shroud members are releasably held together in assembled position by one or more adjustable straps which encircle the shroud assembly. The use of such straps enables the shroud members to be held together with a substantially uniform pressure along their joining surfaces. As a result, localized pressures which may result in the warping or distortion of the joining surfaces of the shroud members are avoided and a more effective seal is created.

In one embodiment, reinforcing ribs are disposed on at least one surface of the shroud members. Preferably, the reinforcing ribs are disposed on both the interior surface and exterior surface of the shroud members. In a highly preferred embodiment, the shroud members include a pair of spaced wall members and an annular surface joining the spaced wall members, and the reinforcing ribs are disposed on both the interior and exterior surfaces of the spaced wall members and on the annular surface in the interior of the shroud members.

Preferably, the safety shield further includes outlet means for discharging any fluid accumulated in the chamber. In those cases where a liquid and a vapor may accumulate in the chamber, the outlet means desirably includes a first discharge port for discharging the liquid from the chamber, and a second discharge port for discharging the vapor from the chamber.

In embodiments particularly adapted for use in connection with valves having a valve body and a valve stem extending outwardly from the valve body, the safety shields of the present invention may enclose the valve body and include an aperture for accommodating the valve stem and corrosion resistant gasket means for forming a vapor tight seal between the valve stem and the shroud without interfering with the operation of the valve.

In highly preferred embodiments of the present invention, the safety shield further includes devices for determining the physical conditions within the enclosure. Desirably, the devices for determining the physical conditions within the enclosure include pressure sensing means, fluid sensing means wherein the fluid is a liquid and/or a vapor, temperature sensing means, and the like. Most desirably, the safety shield in accordance with this embodiment will further include alarm means responsive to signals generated by these devices.

Preferred embodiments of the present invention provide an improved safety shield wherein dangerous liquids and vapors which may leak from a joint or a valve in a piping system may be safely intercepted and contained. The safety shield is attached around a pipe joint in a secure fashion which will not be readily dislodged. Such safety shield not only satisfies the requirements of corporate safety programs, but prevents the undesirable release of harmful materials into the atmosphere and thereby facilitates full compliance with federal and state environmental regulations.

Furthermore, preferred embodiments of the present invention provide an improved safety shield which permits such contained liquids and vapors to be safely drained therefrom, thereby preventing the exposure of maintenance workers to such hazardous materials. In addition, the reinforced structure of the safety shield permits the attachment of various sensing and alarm devices which enhance the safety associated with using such shields.

Moreover, the preferred safety shield according to the present invention provides these improvements while at the same time being highly resistant to attack by the chemicals carried in the pipeline.

BRIEF DESCRIPTION OF THE DRAWINGS

A more complete appreciation of the subject matter of the present invention and the various advantages thereof can be realized by reference to the following detailed description, in which reference is made to the accompanying drawings in which.

DETAILED DESCRIPTION OF THE PREFERRED EMBODIMENTS

For the purpose of describing the features of the present invention, one embodiment of the improved safety shield is discussed in association with a well-known type of flanged pipe coupling typically found in chemical and similar industries which handle corrosive or otherwise hazardous fluids. As used herein, the term "fluid" refers to materials in any physical state which are capable of flowing through piping systems. Generally, the fluid materials referred to herein are liquids and/or vapors.

Such couplings generally include flanged sections having faces lying in planes normal to the longitudinal axis of the pipe. In a typical assembly, a gasket is inserted between the faces of the flanged sections which are then fastened together by bolts to form a liquid-tight joint. Although described in association with flanged pipe couplings, it is contemplated that the improved safety shield of the present invention may be assembled about any joint which may be formed in a piping system. As used herein, the term "pipe joint" refers to the seam formed by the assembly of individual components of the piping system. Such joints include, but are not limited to, the connection between segments of pipe, valves, gauges, expansion joints, meters, couplings and the like.

Fluids flowing through piping systems frequently encounter or create weak spots at pipe joints, particularly when they travel under high pressure. Such weak spots typically result from the deterioration of or defects in the gaskets assembled in the joint. When encountered, such weak spots may permit hazardous liquids and vapors to escape from the piping system. These liquids and vapors present a substantial danger not only to the equipment and personnel in close proximity to the pipe joint, but to the environment as well. In those cases where the leaking substance is toxic the dangers are magnified.

Another embodiment of the improved safety shield of the present invention is described in association with a valve incorporated in a piping system. These valves take many different forms and may be operated either manually or automatically. In most cases, however, the valves include a valve body and some form of valve element arranged in the valve body for movement between positions in which the valve element partially or completely obstructs the flow of fluid materials through the valve body and a position in which the valve element does not obstruct the fluid material flow at all. In most cases, a valve stem connected to the valve element and extending outwardly of the valve body provides a mechanism for maneuvering the valve element between these positions. A valve stem seal is ordinarily provided to prevent the fluid materials coursing through the piping system from leaking out from between the valve body and valve stem. After repeated use or prolonged exposure to corrosive materials, these valve stem seals may fail, enabling the hazardous liquids and vapors within the piping system to escape.

The present invention provides an improved safety shield to intercept and contain any fluids, particularly liquids and vapors, which may escape from a failed pipe joint or a leaking valve, thereby protecting persons and objects in the vicinity of such a leaking component from possible serious injury, and protecting the environment from further endangerment.

Referring to the Figures, safety shield 10 has a generally annular shape formed by the assembly of shield members 12 and 14. Typically, shield members 12 and 14 are formed from a rigid or semi-rigid impervious material which is highly resistant to chemical attack. In some situations it is desirable to form shield members 12 and 14 from a flexible material such as polyethylene, polytetrafluoroethylene and the like in order to accommodate the expansion or other relative displacement of the piping system components. In other situations, safety shield 10 may encounter relatively high pressures caused in particular by vapors leaking from a pipe joint. In these situations, it is preferable to form shield members 12 and 14 from a more rigid material which will not deform under these high pressures and which will therefore render safety shield 10 less susceptible to leakage. Preferred materials in this regard include polypropylene, stainless steel and other chemically resistant materials. More preferably, shield members 12 and 14 are formed from a chemically resistant organic polymer base material, such as polypropylene, polyethylene or polytetrafluoroethylene, to which fiberglass has been added as a reinforcing agent. Preferably, the fiberglass additions comprise between about 10 wt. % and about 50 wt. % of the entire composition; more preferably between about 20 wt. % and about 40 wt. % of the composition; and still more preferably about 30 wt. % of the composition. The addition of the fiberglass reinforcement has a negligible affect on the chemical resistance of the safety shield. As a result, these materials provide a safety shield which is lightweight and which is capable of withstanding pressures of about 200 psi or greater.

Shield member 12 has spaced semi-annular walls 16 and 18 joined together by an arcuate portion 20. Opposite arcuate portion 20, shield member 12 has a free edge 22, one portion of which includes substantially flat sections 22a and 22b which lie generally in a plane running through the longitudinal axis of safety shield 10 and which define a joining region for mating with a similar joining region on shield member 14. Another portion of free edge 22 includes section 22c on wall 16 and section 22d on wall 18, each of which forms a semicircular path a spaced distance from the longitudinal axis of safety shield 10. Each of free edge sections 22a–d may include a recessed groove 23 for receiving a sealing member as will be described more fully below.

In order to provide safety shield 10 with increased structural rigidity and increased resistance to distortion under high internal pressures, shield member 12 may be provided with reinforcing structures. In one embodiment, annular wall members 16 and 18 may be provided with external reinforcing ribs 24 which extend codirectionally between free edge 22 and arcuate portion 20. In preferred embodiments, shield member 12 may also include reinforcing ribs formed on the interior surfaces thereof. Such ribs may be provided in place of or in addition to ribs 24, and may include both longitudinal ribs 26 and transverse ribs 28 on the inside surface of arcuate portion 20 and ribs 29 extending codirectionally on the inside surface of walls 16 and 18 between arcuate portion 20 and free edge 22. Forming ribs 24, 26, 28 and 29 with a thickness of about 1/16 inch and a depth of about 1/4 inch provides sufficient structural strength without interfering with the fit of safety shield 10 around a pipe flange, valve or other such joint.

Shield member 14 may be structurally identical to shield member 12. Thus, shield member 14 has spaced semi-annular walls 30 and 32 joined together by an arcuate portion 34. Opposite arcuate portion 34, shield member 14 has a free edge 36. One portion of free edge 36 includes substantially flat sections 36a and 36b which lie generally in a plane running through the longitudinal axis of safety shield 10 and which define a joining region for mating with the similar joining region on shield member 12. Another portion of free edge 36 includes section 36c on wall 30 and a similar section 36d (not shown) on wall 32, each of which forms a semicircular path a spaced distance from the longitudinal axis of safety shield 10. Although not shown, free edge sections 36a–d may also include a recessed groove for receiving a sealing member, similar to the groove 23 formed in shield member 12. Again, shield member 14 may be formed with reinforcing structures for increasing the structural rigidity thereof. In one embodiment, reinforcing ribs 38 may extend codirectionally on the external surface of annular wall members 30 and 32 between free edge 36 and arcuate portion 34. Preferably, the internal surfaces of shield member 14 may be formed with reinforcing ribs (not shown), such as those described above in connection with shield member 12.

Figure 5:
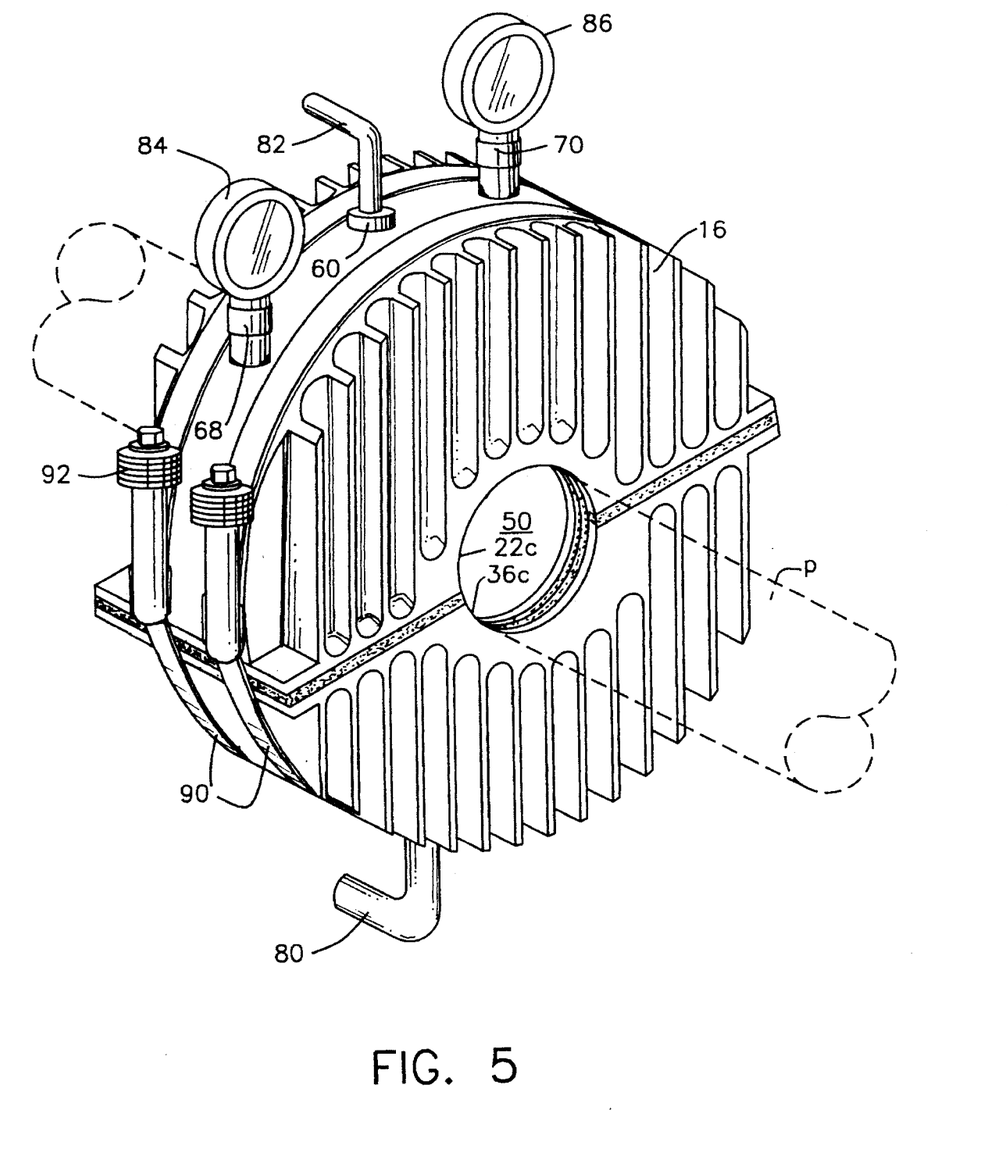
FIG. 5 is a perspective view showing the safety shield of FIG. 1, with gauges and outlet means attached thereto, in assembly about a pipe joint.

In assembled position around a pipe P, as shown in FIG. 5, shield members 12 and 14 define aperture 50, the circumference of which is defined by free edge sections 22c and 36c, and a similar aperture 52 (not shown), the circumference of which is defined by free edge sections 22d and 36d. Apertures 50 and 52 are sized to snugly engage the portions of pipe P on either side of the flanged pipe coupling. Thus, when used for pipes P having a large diameter, safety shield 10 has correspondingly large apertures 50 and 52; when pipes P have a small diameter, apertures 50 and 52 are correspondingly small.

Figure 1:
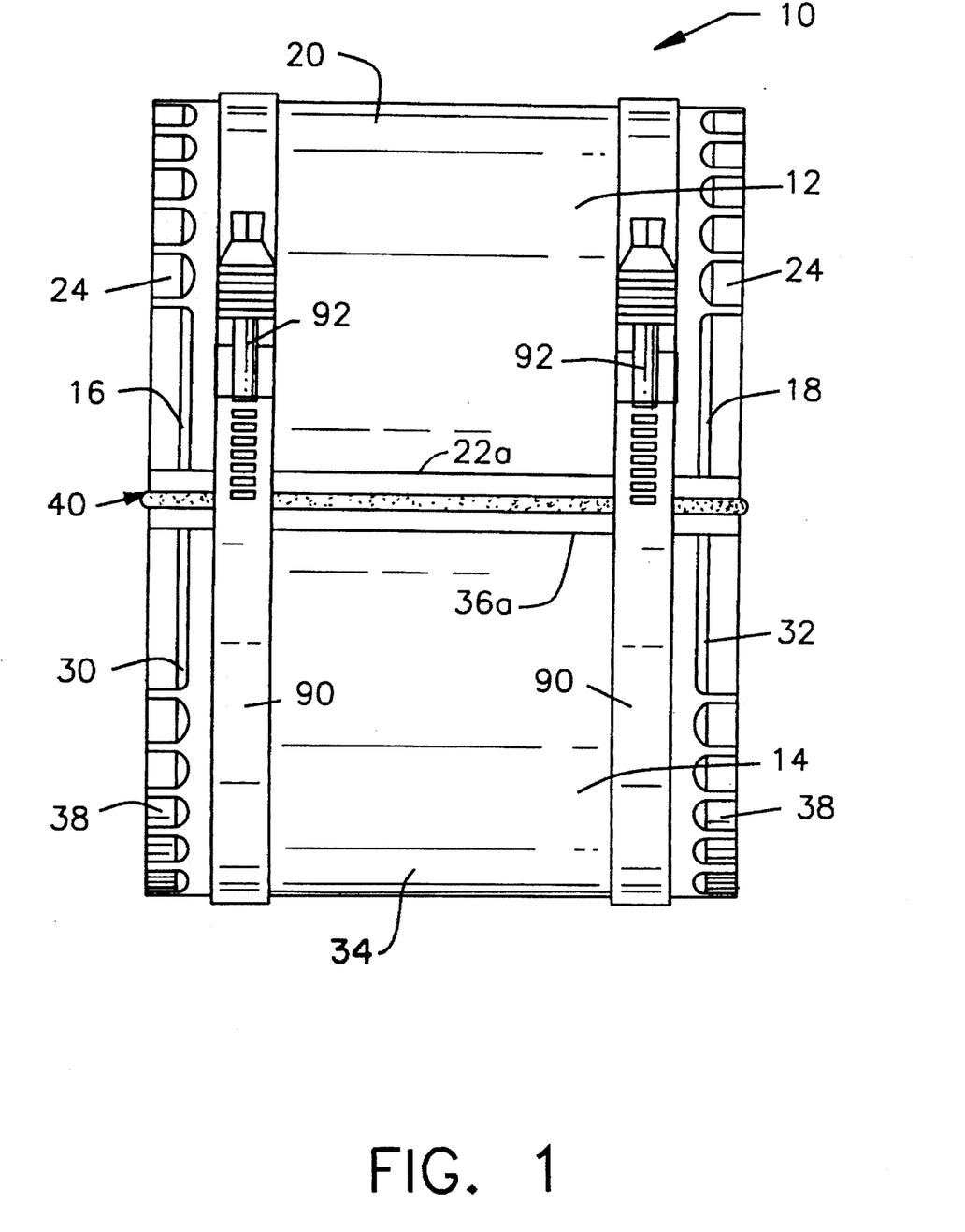
FIG. 1 is a front elevational view of an improved safety shield for a pipe coupling in accordance with one embodiment of the present invention.
Figure 2:
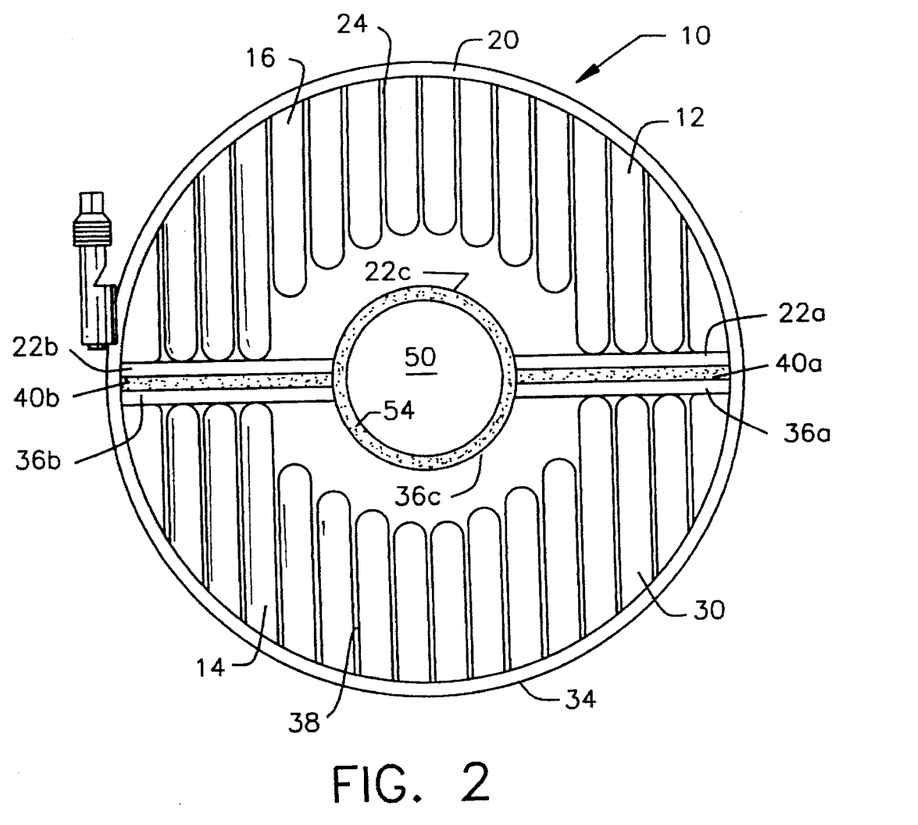
FIG. 2 is a side elevational view of the safety shield of FIG. 1.
Figure 3:
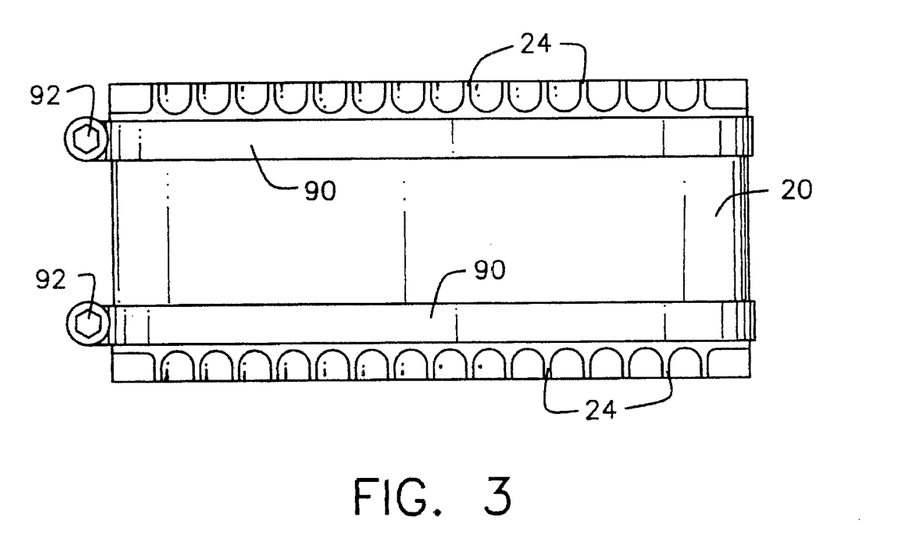
FIG. 3 is a top plan view of the safety shield of FIG. 1.
Figure 4:
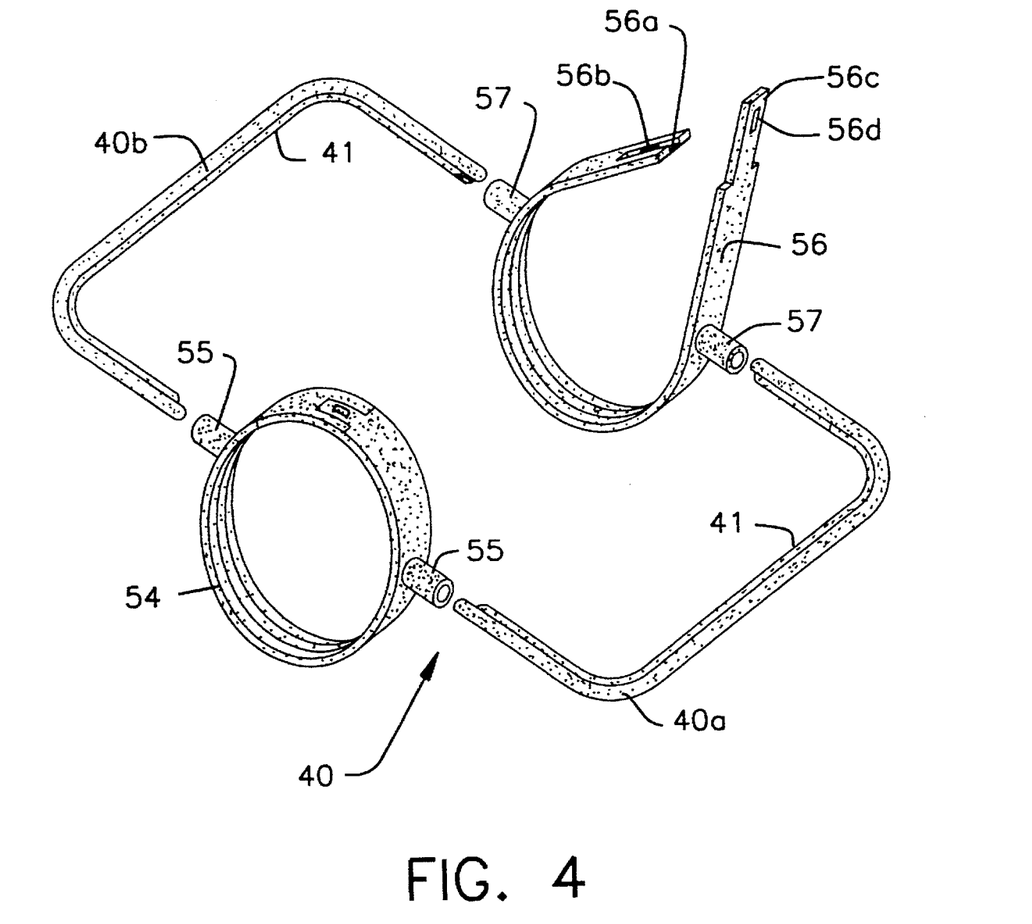
FIG. 4 is a perspective view showing one embodiment of a gasket assembly for use with the safety shield of the present invention.

So that safety shield 10 may provide a liquid-tight and vapor-tight enclosure in assembled position about a flanged pipe coupling, a gasket assembly 40 is interposed between shield members 12 and 14. A preferred gasket assembly 40 is shown in FIG. 4. Gasket assembly 40 includes a first U-shaped gasket portion 40a having a round or similar cross-section for seating in the groove 23 between free-edge sections 22a and 36a on one-half of safety shield 10, and a second U-shaped gasket portion 40b having a round or similar cross-section for seating in the groove 23 between free edge sections 22b and 36b in the other half of safety shield 10 to seal the joining region between shield members 12 and 14. In an alternate arrangement, the cross-section of groove 23 may have a different shape, such as rectangular, and U-shaped gasket portions 40a and 40b may have a corresponding shape to seat within the groove 23 so as to provide an effective seal between shield members 12 and 14. Preferably, gasket portions 40a and 40b may include a rib 41 extending along their lengths to increase the area of contact between the gasket members and the shield members so as to provide an improved seal.

In order to assure a liquid- and vapor-tight seal about pipe P, aperture 50 is provided with a gasket member 54. Aperture 52 is provided with a similar gasket member 56. Gasket members 54 and 56 are preferably formed with a round or similar cross-section for seating within the groove 23 in free edge sections 22c and 22d in shield member 12 and in free edge sections 36c and 36d in shield member 14. In a particularly preferred arrangement, shown in FIG. 4, gasket members 54 and 56 may be formed with a rectangular outer surface for seating within a rectangular groove 23, and a round inner surface for seating against pipe P.

So that gasket members 54 and 56 may be assembled about pipe P, these gasket members are formed as an elongated strip of gasket material having fastening members at the opposite ends thereof. As shown in FIG. 4, one end of gasket member 56 is recessed as at 56a and includes a protruding nub 56b. The opposite end of gasket member 56 has a tab extension 56c which is sized and shaped for mating engagement with recess 56a. An aperture 56d in tab extension 56c receives nub 56b to interlock the ends of gasket member 56 together. The ends of gasket member 54 are provided with a similar fastening mechanism for assembling and holding gasket member 54 in place around pipe P.

Gasket members 54 and 56 also include a pair of hollow bosses 55 and 57, respectively, which lie diametrically opposed to one another in the assembled position of gasket members 54 and 56. Bosses 55 and 57 are sized and shaped to receive the ends of gasket members 40a and 40b for joining the several gasket members together into a complete gasket assembly 40. Joining the gasket members together in a single assembly assures the formation of a continuous seal between shield members 12 and 14 in assembled position around pipe P. Gasket members 40a, 40b, 54 and 56 alternately may be formed as a single integral unit, thereby eliminating the need to join the individual gasket members to one another. Preferably, gasket members 40a, 40b, 54 and 56 are formed from a material which is sufficiently chemically resistant to withstand attack from the corrosive liquids and/or vapors which are retained by safety shield 10, but which is sufficiently pliable to form a liquid- and vapor-tight seal when safety shield 10 is in assembled position about pipe P. An example of one such material is polytetrafluoroethylene.

Shield members 12 and 14 may be securely held in assembled position around pipe P by any suitable means. In a preferred embodiment shown in FIG. 5, shield members 12 and 14 are held in place by a pair of bands or straps 90 which encircle and engage the outer periphery of shield members 12 and 14. Bands 90 are of the type which is commonly available for clamping around substantially round structures and include a threaded fastener 92 which can be turned in a clockwise direction in order to tighten the clamping pressure of bands 90 around shield members 12 and 14 or turned in a counterclockwise direction in order to loosen the clamping pressure of bands 90 around shield members 12 and 14 for disassembly. Bands 90 apply a substantially uniform radially directed force to shields members 12 and 14 which creates a substantially uniform pressure distribution along the joining region between the shield members. This substantially uniform pressure distribution eliminates the warping or other distortion of the shield members which typically results when the shield members are joined together at discrete locations, such as by nut and bolt fasteners, clamps, etc. To assure that the pressure is applied as uniformly as possible around the circumference of safety shield 10, the outer surface of arcuate portion 20 of shield member 12 gradually tapers outwardly as it approaches free edge 22, forming regions 25 of increasing thickness at diametrically opposed sides of shield member 12. Similar regions of increasing thickness (not shown) are formed on the diametrically opposed free edges of shield member 14. These regions of increasing thickness together assure continuous contact of bands 90 with the outer periphery of safety shield 10 so as to eliminate any localized stresses which may result from point contact. In that regard, the thickened regions on shield members 12 and 14 may extend along the entire width of the shield members, or may be confined to a relatively narrow region defining the positions for the assembly of bands 90.

The present invention also contemplates forming safety shield 10 with a pair of apertures which are not in axial alignment. Thus, should it be desirable to assemble a safety shield about an elbow coupling or other device which angularly displaces the portions of pipe with respect to one another, apertures 50 and 52 may be formed with a corresponding angular displacement for sealing engagement thereabout. Similarly, the present invention contemplates forming safety shield 10 with a single aperture 50 for assembly about a joint at an unattached end of pipe.

As shown in the Figures, shield member 12 may include a boss member 60 having a threaded aperture in communication with the interior of safety shield 10. Shield member 14 may include a similar boss member (not shown) having a threaded aperture communicating with the interior of safety shield 10. When provided in shield members 12 and 14, these threaded apertures provide a means for forming leak-proof connections with safety shield 10.

One useful purpose for such leak-proof connections with safety shield 10 is to enable any liquid and/or vapor retained in the interior of safety shield 10 to be removed therefrom without the need for disassembling safety shield 10 from about the flanged pipe coupling. Thus, as shown in FIG. 5, a conduit 80 may be threadedly engaged with the aperture at or near the bottom of safety shield 10 in order to provide a means for safely draining any liquid which may be contained by or accumulated within safety shield 10. Similarly, conduit 82 may threadedly engage the aperture in boss member 60 at or near the top of safety shield 10 in order to safely evacuate any toxic or otherwise harmful vapors which may be contained by or accumulate in safety shield 10. Conduits 80 and 82 may direct the leaked fluid from safety shield 10 back into pipe P or to other locations as desired.

In certain situations it may be desirable to monitor the conditions in the interior of safety shield 10. In those situations, additional boss members such as 68 and 70 having associated threaded apertures may be included to provide a useful means which enable various gauges or other components to access the interior of safety shield 10 in a leak-proof manner. FIG. 5 shows two such gauges 84 and 86 fixedly attached to shield member 12 for communication with the interior of safety shield 10. Gauges 84 and 86 may consist of pressure gauges for measuring the pressure within safety shield 10, temperature gauges for measuring the temperature within safety shield 10, vacuum gauges for testing the integrity of the seal formed by safety shield 10, and the like. Additionally, instead of or in addition to gauges 84 and 86, shield member 10 may have attached thereto various other components, such as level switches, flow switches, liquid and/or gas detectors, alarm systems, valves, or any other component which may be desirable for insuring the safety and operability of safety shield 10. Any number of threaded apertures communicating with the interior of the safety shield 10 may be employed, provided that the strength and integrity of the safety shield is not compromised thereby.

Figure 6:
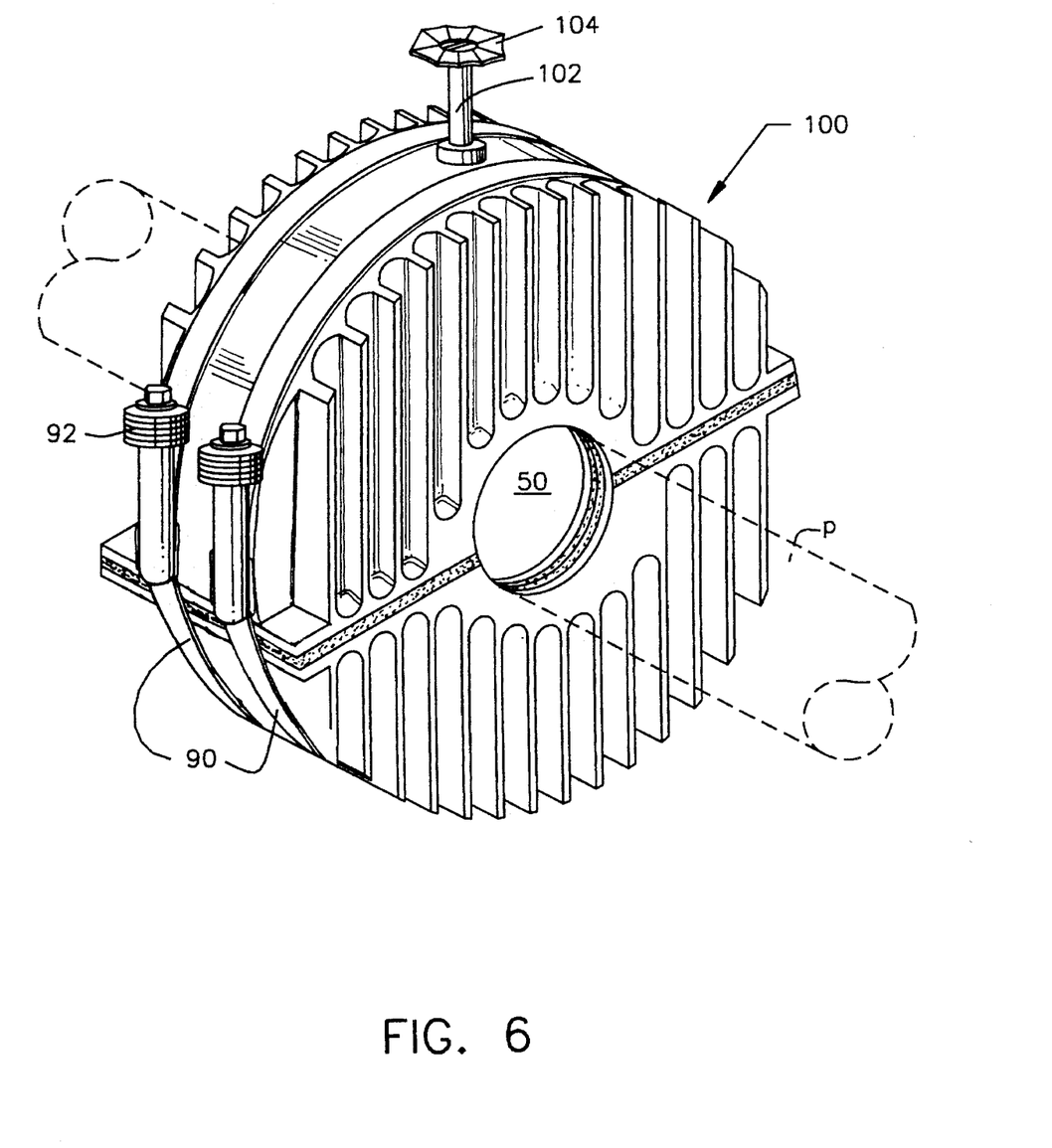
FIG. 6 is a perspective view showing a safety shield in accordance with another embodiment of the present invention in assembly about a valve body.
Figure 7:
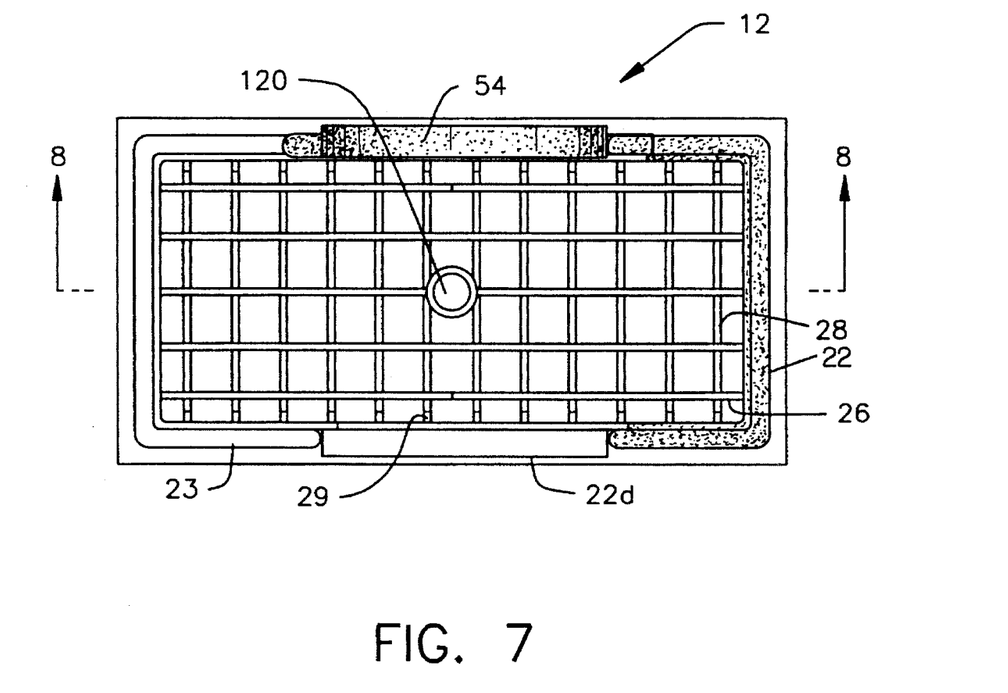
FIG. 7 is a bottom plan view of one shield member from the safety shield of FIG. 6.
Figure 8:
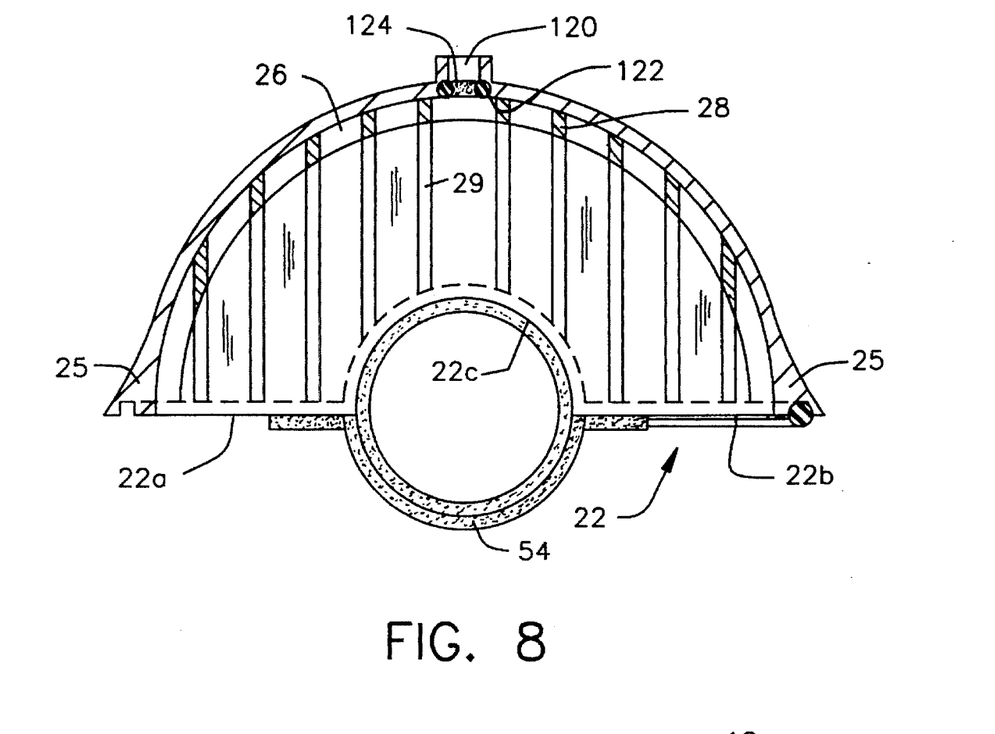
FIG. 8 is a sectional view taken along line 8—8 of FIG. 7.

In another embodiment of the present invention, the safety shield may be particularly adapted for providing a liquid- and vapor-tight seal about a valve in a piping system. A safety shield 100 in accordance with this embodiment of the present invention is shown in FIGS. 6–8. Typically, such valves include a valve body (not shown) which houses a valve seat (not shown) and a valve element (not shown) which is movable between a closed position in which the valve element mates with the valve seat to prevent flow of fluids through the valve body, and an open position in which the valve element is remote from the valve seat so that fluid may flow through the valve body. Such valves also typically include a valve stem 102 operatively connected to the valve element at one end and extending through the valve body for connection to an operating handle 104 at the other end. Operation of the valve handle 104 in one rotational direction moves the valve element to the closed position and operation of the valve handle in the opposite rotational direction moves the valve element to the open position.

Safety shield 100 is in all respects substantially identical to safety shield 10 described above. Thus, safety shield 100 includes a pair of shield members 12 and 14 which, in assembled position, define apertures 50 and 52 (or, in some embodiments, only a single aperture 50) for snugly engaging a pipe P. A gasket assembly 40 interposed between shield members 12 and 14 enables safety shield 100 to create a liquid-tight and vapor-tight enclosure in the assembled position.

Shield member 12 includes an aperture 120 sized and shaped to snugly receive valve stem 102 therethrough so that valve handle 104 may be manipulated to operate the valve with safety shield 100 in assembled position thereabout. Aperture 120 includes a groove 122 in which a gasket 124, formed from the same corrosion resistant material as gasket assembly 40, is seated to form a liquid-tight and vapor-tight seal between valve stem 102 and shield member 12. This seal thus prevents fluid leakage out from safety shield 100 without interfering with the operation of the valve.

To assemble safety shield 100 over a valve in a piping system, valve handle 104 is initially removed from valve stem 102. Gasket members 54 and 56 are then assembled around pipe P on either side of the valve at appropriate positions so that they would be aligned with the groove 23 in free edge sections 22c and 22d in shield member 12 and in free edge sections 36c and 36d in shield member 14. Gasket members 40a and 40b are then assembled to gasket members 54 and 56 by inserting the respective ends thereof into hollow projections 55 and 57. With gasket 124 in place in groove 122, shield member 12 is placed over the valve so that valve stem 102 protrudes through aperture 120. Shield member 14 may then be assembled to shield member 12, being careful to assure that gasket members 40a, 40b, 54 and 56 are properly seated within groove 23. The shield members may then be held in this assembled position by positioning one or more bands 90 around the circumference of safety shield 100 and tightening threaded fastener 92 to compress the portions of gasket assembly 40 into sealing engagement between shield members 12 and 14 and between the shield members and pipe P. Valve handle 104 may then be reassembled to valve stem 102. Finally, any outlet conduits, gauges, alarms, etc. may be assembled to safety shield 100.

Although the invention herein has been described with reference to particular embodiments, it is to be understood that these embodiments are merely illustrative of the principals and applications of the present invention. It is therefore to be understood that numerous modifications may be made to the illustrative embodiments and that other arrangements may be devised without departing from the spirit and scope of the present invention as set forth in the appended claims.

We claim:

1. A safety shield for capturing a corrosive fluid escaping from a joint in a pipe, comprising first and second shroud members formed from a corrosion resistant material, connecting means for releasably joining said first and second shroud members together along a joining region to form an enclosed chamber in assembled position about said pipe joint, corrosion resistant gasket means arranged between said first and second shroud members for rendering said joining region vapor tight in said assembled position, at least one aperture in said enclosed chamber sized and shaped for mating engagement around said pipe, corrosion resistant sealing means for forming a vapor-tight seal between said pipe and said at least one aperture, said sealing means having first and second ends and being installed around said at least one aperture to form a continuous circle with said first and second ends in overlapping engagement, said sealing means being joined to said gasket means in overlapping relationship to render said enclosed chamber vapor tight in said assembled position, and outlet means for discharging any said fluid accumulated in said chamber.

2. A safety shield as claimed in claim 1, further comprising reinforcing ribs disposed on at least one surface of said shroud members.

3. A safety shield as claimed in claim 2, wherein said reinforcing ribs are disposed on both an interior surface and an exterior surface of said shroud members.

4. A safety shield as claimed in claim 1, further comprising means for determining the physical conditions within said chamber.

5. A safety shield as claimed in claim 1, wherein said connecting means includes at least one band assembled in engagement around an outer periphery of said first and second shroud members, whereby a substantially uniform pressure is exerted along said joining region between said first and second shroud members.

6. A safety shield for capturing a corrosive fluid escaping from a joint in a pipe, comprising first and second shroud members formed from a corrosion resistant material and defining a joining region for releasably joining said first and second shroud members together to form an enclosed chamber in assembled position about said pipe joint, corrosion resistant gasket means arranged between said first and second shroud members for rendering said joining region vapor tight in said assembled position, at least one aperture in said enclosed chamber sized and shaped for mating engagement around said pipe, corrosion resistant sealing means for forming a vapor-tight seal between said pipe and said at least one aperture, said sealing means having first and second ends and being installed around said at least one aperture to form a continuous circle with said first and second ends in overlapping engagement, said sealing means being joined to said gasket means in overlapping relationship to render said enclosed chamber vapor tight in said assembled position, outlet means for discharging any said fluid accumulated in said chamber, and connecting means for releasably joining said first and second shroud members together, said connecting means including at least one band assembled in engagement around an outer periphery of said first and second shroud members, whereby a substantially uniform pressure is exerted along said joining region between said first and second shroud members.

7. A safety shield for capturing a corrosive fluid escaping from a valve assembled to a pipe, said valve including a valve body and a valve stem extending from said valve body for operating said valve, said safety shield comprising first and second shroud members formed from a corrosion resistant material, connecting means for releasably joining said first and second shroud members together along a joining region to form an enclosed chamber in assembled position about said valve body, corrosion resistant gasket means arranged between said first and second shroud members for rendering said joining region vapor tight in said assembled position, at least one aperture in said enclosed chamber sized and shaped for receiving said valve stem therethrough, first corrosion resistant sealing means for forming a vapor-tight seal between said valve stem and said at least one aperture without interfering with the operation of said valve, at least one other aperture in said enclosed chamber sized and shaped for mating engagement around said pipe, and second corrosion resistant sealing means for forming a vapor-tight seal between said pipe and said at least one other aperture, said sealing means having first and second ends and being installed around said at least one other aperture to form a continuous circle with said first and second ends in overlapping engagement, said sealing means being joined to said gasket means in overlapping relationship to render said enclosed chamber vapor tight in said assembled position.

8. A safety shield as claimed in claim 7, wherein said connecting means includes at least one band assembled in engagement around an outer periphery of said first and second shroud members, whereby a substantially uniform pressure is exerted along said joining region between said first and second shroud members.

9. A safety shield for capturing a corrosive fluid escaping from a joint in a pipe, comprising first and second shroud members formed from a corrosion resistant material, fasteners for releasably joining said first and second shroud members together along a joining region to form an enclosed chamber in assembled position about said pipe joint, at least one aperture in said enclosed chamber for receiving said pipe therethrough, a corrosion resistant gasket arranged between said first and second shroud members in said joining region, and a corrosion resistant strip having first and second ends, said strip being installed around said at least one aperture in the form of a circle with said ends overlapping one another, said gasket and said strip cooperating with one another to render said enclosed chamber vapor tight in said assembled position.

10. The safety shield as claimed in claim 9, wherein said strip includes a projection extending radially from said circle and said gasket is joined to said projection in overlapping relationship.

* * * * *